United States Patent [19]
Erck

[11] Patent Number: 5,823,454
[45] Date of Patent: Oct. 20, 1998

[54] FILM TRANSPORT APPARATUS

[75] Inventor: Gary Lee Erck, Webster, N.Y.

[73] Assignee: Eastman Kodak Company, Rochester, N.Y.

[21] Appl. No.: 670,947

[22] Filed: Jun. 26, 1996

[51] Int. Cl.$^6$ .................................................. G03B 1/12
[52] U.S. Cl. ...................... 242/332; 242/354; 242/356.2; 396/413
[58] Field of Search ................................. 242/332, 332.1, 242/340, 354, 356, 356.2, 356.5, 356.6, 356.7, 564.3, 564.4, 348.3; 396/413

[56] References Cited

U.S. PATENT DOCUMENTS

| | | | |
|---|---|---|---|
| 3,682,408 | 8/1972 | Sorimachi | 242/340 |
| 3,771,745 | 11/1973 | Yamada | 242/354 |
| 4,145,011 | 3/1979 | Date | 242/354 |
| 4,171,893 | 10/1979 | Kawazoe | 396/413 |
| 4,221,349 | 9/1980 | Clampitt et al. | 242/332 |
| 4,482,226 | 11/1984 | Tamamura | 242/356 |
| 4,855,773 | 8/1989 | Harvey | 396/413 |
| 4,967,213 | 10/1990 | Han | 242/356.2 |
| 4,992,811 | 2/1991 | Fridman | 396/413 |
| 5,160,953 | 11/1992 | Iwashita et al. | |
| 5,456,419 | 10/1995 | Ezawa | 242/356 |
| 5,477,288 | 12/1995 | Miyazaki et al. | 396/413 |

*Primary Examiner*—John P. Darling
*Attorney, Agent, or Firm*—Raymond L. Owens

[57] ABSTRACT

A film transport apparatus for selectively advancing a film out of, or rewinding a film onto, a spool shaft of a cartridge. The apparatus has:

a) a rotatable member which engages the spool shaft;

b) a first drive assembly for pulling on film remote from the cartridge to assist in advancing the film out of the cartridge;

c) a transmission assembly to thrust film from the spool shaft and rewind it onto the spool shaft, comprising:

a rewind gear positioned to rewind the rotatable member, and a thrust gear positioned to advance the rotatable member through a directional clutch such that when film is pulled from the spool shaft by the first drive assembly the thrust gear will disengage from the rotatable member; and a gear train which selectively engages the thrust or rewind gear; and d) a drive to drive the first drive assembly and the gear train.

8 Claims, 5 Drawing Sheets

FILM TRANSPORT APPARATUS

FIELD OF THE INVENTION

The invention relates generally to a film transport apparatus for thrusting or rewinding a film from a cartridge, and to devices, such as a scanner, using such a transport apparatus.

BACKGROUND OF THE INVENTION

Scanners are used to convert hard copy analog images into digital data. The use of scanners has become widespread for a variety of applications, including storing, manipulating, transmitting and displaying or printing copies of images. For example, images captured in photographic media are being converted to digital data and stored on compact or magnetic discs for readout and display as a video image, or for printing with various types of color printers. In order to capture the photographic image digitally, the image frame is scanned with a light beam or line, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in, for example, U.S. Pat. No. A5,012,346.

A typical film scanning process can be divided into three basic functions: focus, prescan, hi-resolution scan. During the focus function, a film to be scanned is advanced until a picture frame is aligned with an aperture in an aperture plate, it is then clamped against the aperture plate, and a CCD is translated through a distance obtaining data at set intervals which a host computer evaluates to determine the optimum focus position. The prescan function translates the complete film strip past the CCD without clamping it to the aperture plate. The film is advanced at a rapid rate to obtain coarse sampling data to determine the proper density levels to use during the high resolution scan. The high resolution scan requires advancing and positioning each frame accurately at the aperture opening, clamping the film in place, and then translating the whole scanner gate (which includes the aperture plate) via a precision translation stage.

Scanning a processed film in the recently introduced Advanced Photo System ("APS") film cartridge requires further considerations than scanning a traditional 35 mm film canister. In particular, an APS film cartridge is quite different from the traditional 35 mm film canisters. The cartridge also has on one end a consumer readable indicator in the form of a Visual Exposure Indicator ("VEI") which is a part of the film spool and indicates the current state of the film within. In the VEI a full circle indicates a new roll, a half moon indicates a partially exposed roll, a cross indicates a fully exposed roll, and a rectangle indicates a processed roll). After processing an APS film, the film is reattached to the film spool inside the cartridge and stored in this manner for the consumer. The cartridge has a light lock door which is locked in a closed position and requires a key type device to unlock and open. The film is wound on the film spool and constrained between two cupped flexible mylar type thrust discs which provide the film with its outward force when exiting the cartridge. When rewound into the cartridge, a drag force must be imposed on the film which causes the film to be wound sufficiently tight enough that it all is retained inside the thrust discs. Failure to maintain the film inside the thrust discs will result in a cartridge failure the next time an attempt is made to thrust film out.

It would be desirable then, to have a film transport apparatus which can be used with an APS type film in particular, to smoothly and rapidly transport a film both into and out of the film cartridge during the various scanning operations, without jamming or other malfunction of the transport apparatus or film cartridge.

SUMMARY OF THE INVENTION

The present invention provides, in a first aspect, a film transport apparatus for selectively advancing a film out of, or rewinding a film onto, a spool shaft of a cartridge, comprising:

a) a rotatable member which engages the spool shaft;

b) a first drive assembly for pulling on film remote from the cartridge to assist in advancing the film out of the cartridge;

c) a transmission assembly to thrust film from the spool shaft and rewind it onto the spool shaft, comprising:

a rewind gear positioned to rewind the rotatable member, and a thrust gear positioned to advance the rotatable member through a directional clutch such that when film is pulled from the spool shaft by the first drive assembly the thrust gear will disengage from the rotatable member; and a gear train which selectively engages the thrust or rewind gear; and d) a drive means to drive the first drive assembly and the gear train.

In a second aspect of the present invention, a film transport apparatus comprises:

a) a rotatable member which engages the spool shaft;

b) a main drive shaft rotatable in either direction;

c) a first drive assembly connected to be driven from the main drive shaft, for pulling on film remote from the cartridge to assist in advancing the film out of the cartridge;

d) a transmission assembly connected to be driven from the main drive shaft, to thrust film from the spool shaft and rewind it onto the spool shaft, comprising:

a rewind gear positioned to rewind the rotatable member, and a thrust gear positioned to advance the rotatable member through a directional clutch such that when film is pulled from the spool shaft by the first drive assembly the thrust gear will disengage from the rotatable member; and a gear train between the main drive shaft which selectively engages the thrust or rewind gear.

The film transport apparatus has particular application in a scanner of the present invention, although it may also be used in other devices such as a camera. Such a scanner of the present invention additionally comprises:

an elongated film guide positioned to guide film being advanced from or rewound into a cartridge, the guide having an aperture positioned between a cartridge in the apparatus and the first drive assembly; and a light source and a sensor positioned on opposite sides of the aperture such when an image frame of a film to be scanned is positioned in alignment with the aperture, light from the source can pass through the image frame and the aperture and to the sensor.

A film transport apparatus of the present invention is particularly useful with an APS type film. The apparatus can smoothly and rapidly transport a film both from a film spool (such as in a film cartridge) and rewind it back onto the spool, during various operations on the film, particularly scanning, with little tendency to jam or otherwise malfunction or cause a film cartridge such as an APS cartridge, to jam or otherwise become unusable.

BRIEF DESCRIPTION OF THE DRAWINGS

FIGS. 5B is an exploded view of components of the assembly shown in FIG. 5A, while FIG. 5C is a perspective view showing the components of FIG. 5A assembled.

To facilitate understanding, identical reference numerals have been used, where possible, to designate identical elements that are common to the figures.

EMBODIMENTS OF THE INVENTION

Referring to the drawings, the drive train shown includes a reversible electric drive stepper motor 3 under control of a computer (not shown). Drive motor 3 can transmit rotational motion through components of a transmission assembly as follows: through a drive motor pulley 4, a short drive belt 5, a belt pulley 7, a main drive shaft 6, a belt pulley 9, a long drive belt 8, a belt pulley 7, a transfer shaft 14, a lower main gear 15, an idler gear 16, and a transfer gear 22, to a first independently moveable gear 17b which can engage a rewind gear 20, and to a second independently moveable gear 17a which can engage a thrust gear 19. Main gear 15, idler gear 16, transfer gear 22, and independently moveable gears 17a, 17b are components of a gear train which can selectively engage thrust gear 19 or rewind gear 20 as will be described below. Note that transfer gear 22 is thus driven from main drive shaft 6, although indirectly so driven. A belt tensioner 23 presses against long belt 8 in a known manner to maintain belt tension.

Figure 1:
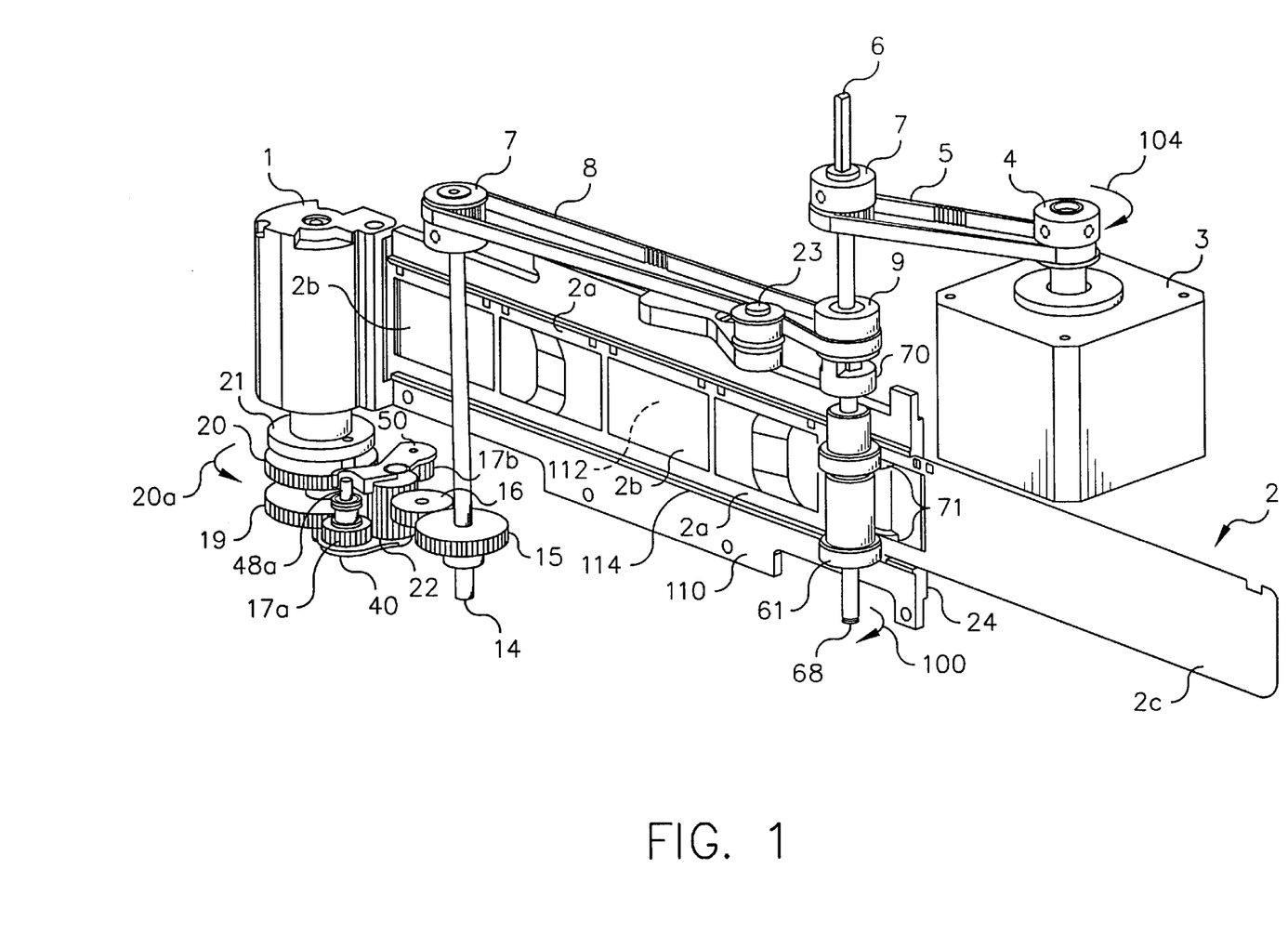
FIG. 1 is a perspective view of a film transport apparatus of the present invention with a film cartridge in place in the apparatus, and also shows associated components of a scanner of the present invention.
Figures 2A, 2B, 2C:
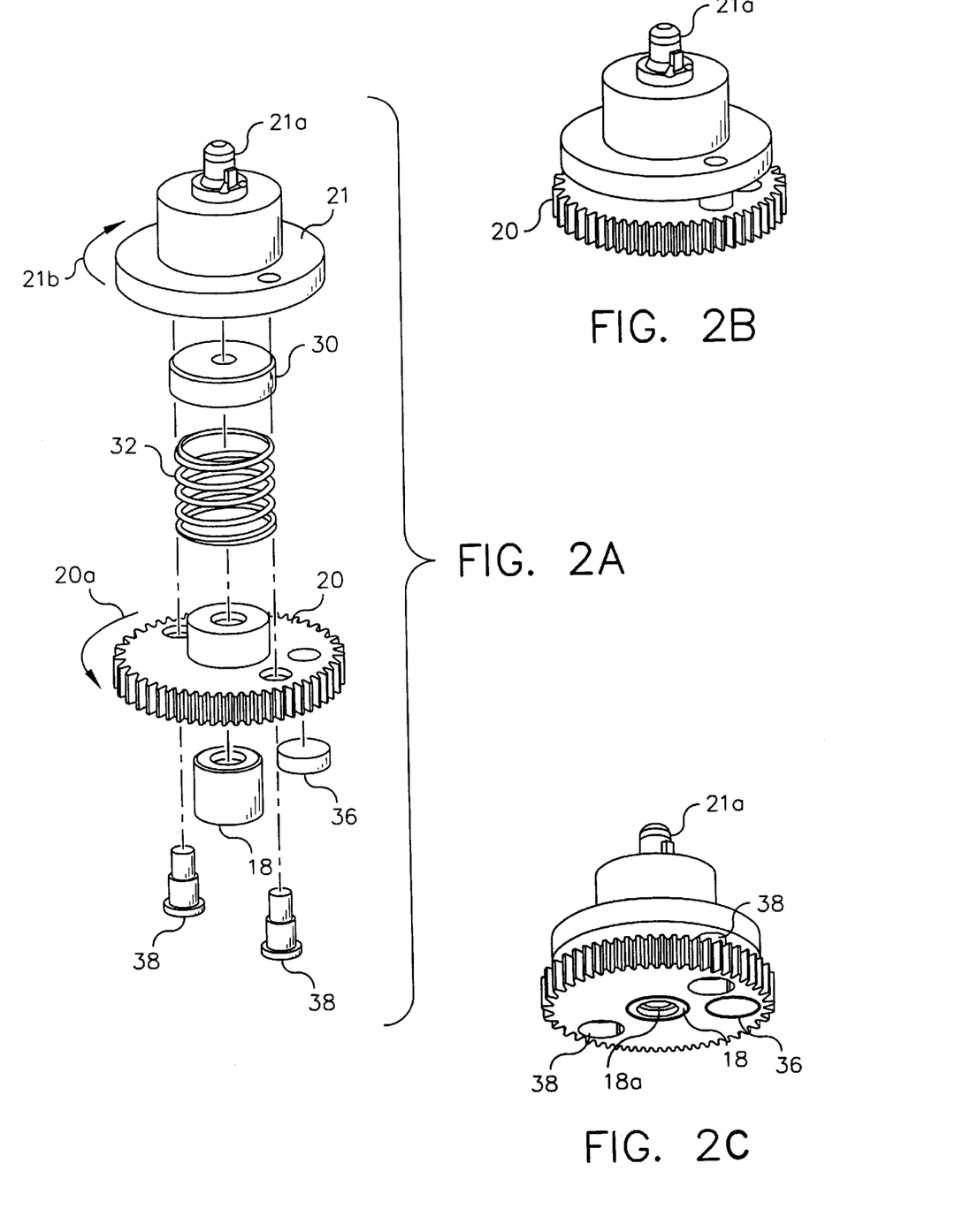
FIGS. 2A is an exploded view illustrating components associated with the rewind gear of the apparatus of FIG. 1.
FIGS. 2B and 2C are perspective views from above and below, respectively, of the assembled components shown in FIG. 2A.

Referring to FIGS. 1, 2A and 2C in particular, rewind gear 20 is attached to a thrust drive spindle 21 by means of two pins 38 and spring 32. The foregoing arrangement allows drive spindle 21 to have a small amount of vertical freedom for alignment with a film cartridge 1. A magnet 36 is positioned in a lower side of rewind gear 20. Spindle 21 acts as a rotatable member which can engage a spool shaft (not shown) on film cartridge 1. In particular, upper end 21a of spindle actually engages the spool shaft. Thus, rewind gear 20, when driven counterclockwise as viewed from above in the FIGS. (that is, in the direction of arrow 20a) will cause spindle 21 to rewind film into cartridge 1.

Thrust gear 19 is pressed onto a shaft (not shown), a top end of which shaft is inserted into an opening 18a in a directional clutch 18 in a lower side of rewind gear 20. The top end also extends into a bushing 30 in spindle 21. Directional clutch 18 is of a type which will cause thrust gear 19 to drive spindle 21 clockwise, but allows spindle 21 to be freely rotated clockwise as viewed from above (that is, in the direction of arrow 21b) at a speed faster than thrust gear 19.

Figure 3A:
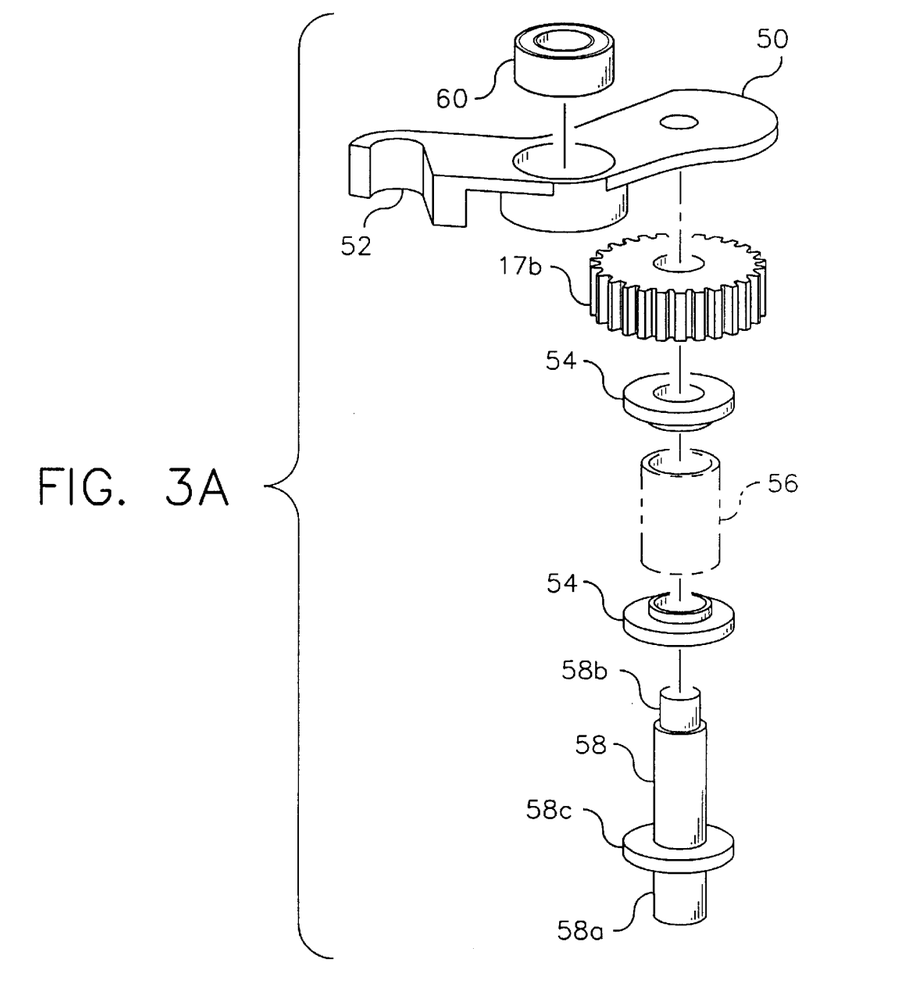
FIG. 3A is an exploded view showing a first independently moveable gear of the gear train, and its associated rocker arm, of the scanner of FIG. 1.
Figure 3B:
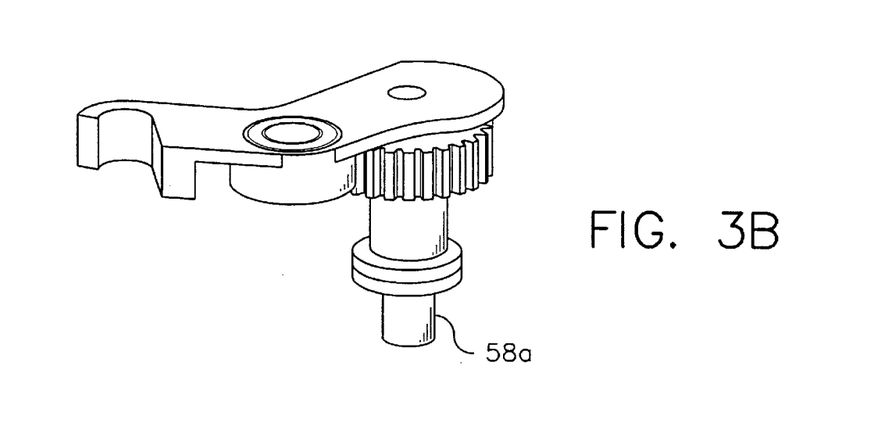
FIG. 3B is a perspective view showing the assembled components shown in FIG. 3A.

Transfer gear 22 is rotatably mounted between a first rocker arm 50 and a second rocker arm 40, each of which rocker arms carry rotatably mounted first and second independently moveable gears 17b, 17a respectively. Gears 17b, 17a are made of Delrin AF plastic. The independent movement of gears 17b, 17a is accomplished as a result of them being rotatably mounted on first and second rocker arms 50, 40 respectively. The mounting of first independently moveable gear 17b on first rocker arm 50 is shown in more detail in FIGS. 3A and 3B. It will be understood that mounting of second independently moveable gear 17a on rocker arm 40 is identical except gear 17a and rocker arm 40 are inverted with respect to gear 17b and rocker arm 50. Turning to FIGS. 3A and 3B, gear 17b is mounted for rotation on first rocker arm 50 by means of a shaft 58, a remote end 58a of which serves as a first axially extending member. A gear 17b is captured between rocker arm 50 on one side, and on the other side a spring 56 surrounded by two bushings 54 one of which abuts a shoulder 58c of shaft 58. Bushings 54 are made of aluminum with a hardcoat finish. An end 58b of shaft 58 is press fitted into a corresponding opening in first rocker arm 50 to be retained therein. First rocker arm 50 has a hook shaped remote end 52 adjacent a remote end 48a of pin 48 (only end 48a of which can be seen in the drawings), while rocker arm 40 has the same type of hook shaped remote end 42 (not visible in the drawings) adjacent remote end 58a of pin 50.

Figure 4A:
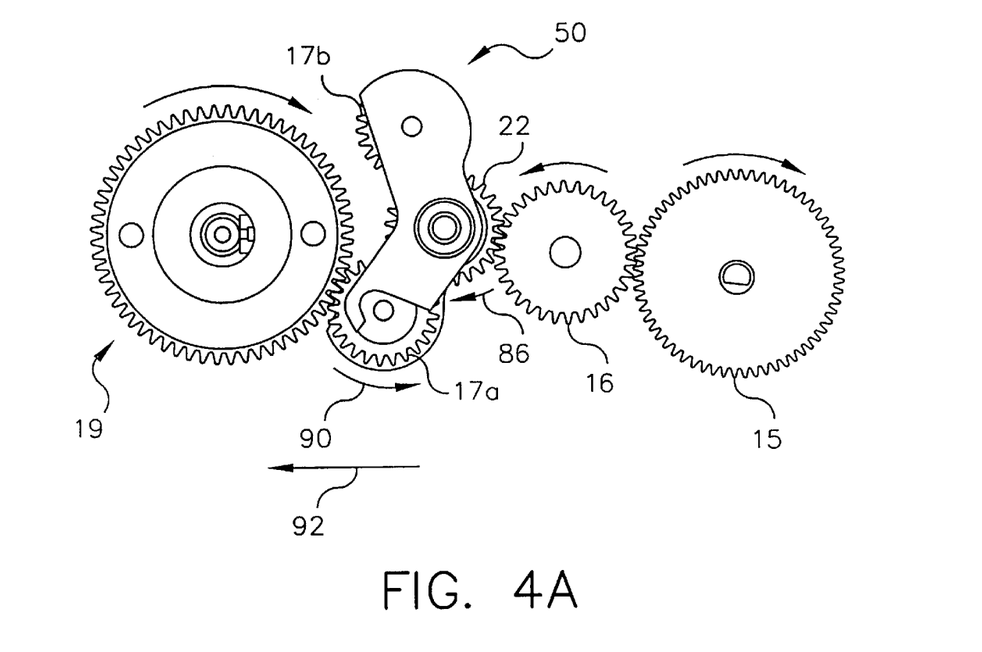
FIG. 4A and 4B are views of gear components from above in FIG. 1, showing the gear components positions when a film is to be advanced out of a spool shaft of a film cartridge (FIG. 4A) or rewound onto the spool shaft (FIG. 4B)
Figure 4B:
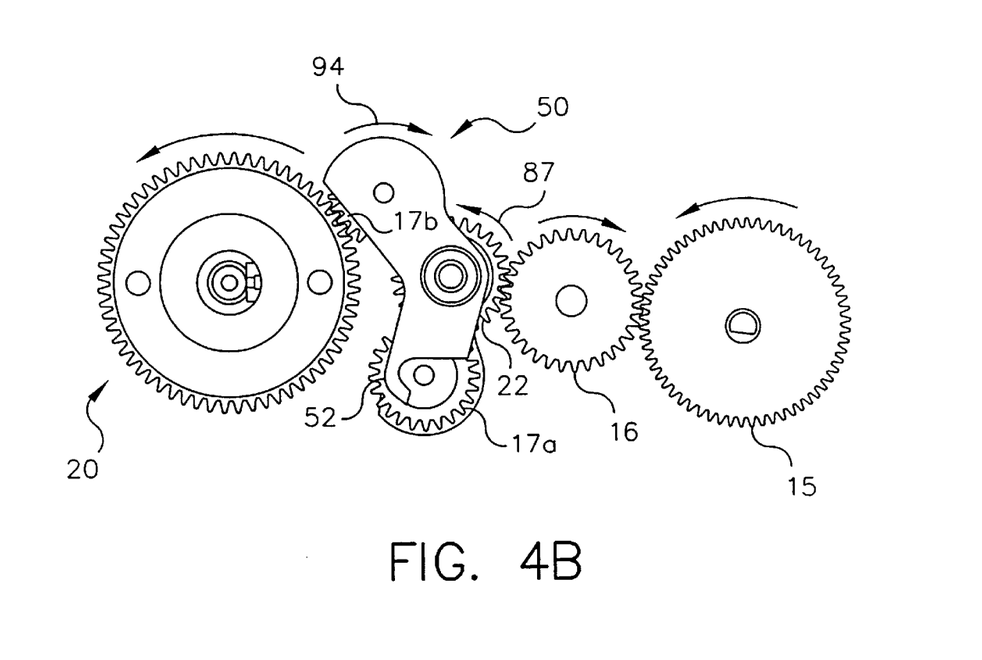

There is a rotational frictional resistance of each independently moveable gear 17b, 17a against its corresponding rocker arm 50, 40 caused by spring 56 and an identical spring 46 (not shown) for rocker arm 40. Because of this, when second independently moveable gear 17a is rotated counterclockwise when viewed from above (that is, in the direction of arrow 90 in FIG. 4A) by transfer gear 22 being rotated clockwise (arrow 86 in FIG. 4A) in the direction of arrow, its associated second rocker arm 40 will be urged leftward (that is, in the direction of arrow 92 in FIG. 4A) carrying gear 17a into engagement with thrust gear 19. At the same time transfer gear 22 will cause first independently moveable gear 17b to rotate counterclockwise in FIG. 4A thereby urging first rocker arm 50 to move to the right carrying gear 17b away from engagement with rewind gear 20. From this it will be appreciated that when the direction of transfer gear 22 is reversed, as illustrated in FIG. 4B, first rocker arm 50 moves first independently moveable gear 17b into contact to drive rewind gear 20, while second rocker arm 40 moves second independently moveable gear 17a away from engagement with thrust gear 19. Note that when first gear 17b is engaged with rewind gear 20, remote end 52 of the corresponding rocker arm 50 is in the path of axially remote end 48a of the other one of the independently moveable gears (second gear 17a) to prevent second gear 17a from simultaneously engaging with thrust gear 19. Similarly, when second gear 17a is engaged with thrust gear 19, remote end 42 is in the path of remote end 48a to prevent first gear 17b from simultaneously engaging with rewind gear 20.

As can be seen in FIG. 1, the film transport apparatus includes an elongated film track 110 which has a recessed channel 114 therein which is of a width sufficient to receive and guide a film 2 from cartridge 1. Track 110 also has an aperture 112 through which a given image frame 2b of the film can be scanned.

Turning to FIGS. 1 and 5A–5C, components of a first drive assembly 60 will now be described. Drive assembly 60 includes a capstan roller 61 which has two raised urethane rubber wheels 62. Wheels 62 are spaced apart a distance so that they engages upon respective edge margins 2a of film 2, while a region 63 between wheels 62 will not contact image frames 2b of film 2. Metal pressure bearing rollers 71 are aligned with wheels 62 on an opposite side of film 2.

Figure 5:
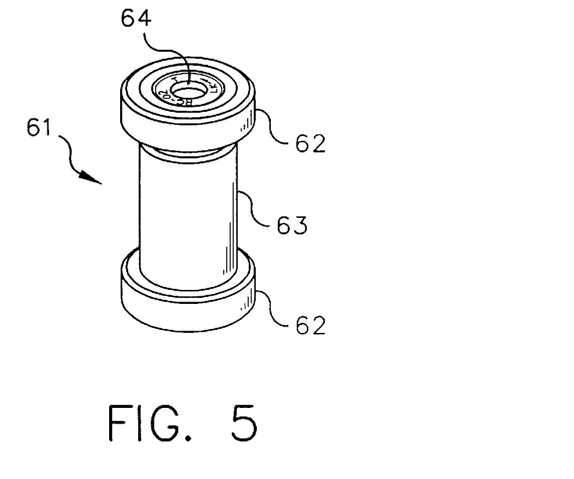
Figure 5A:
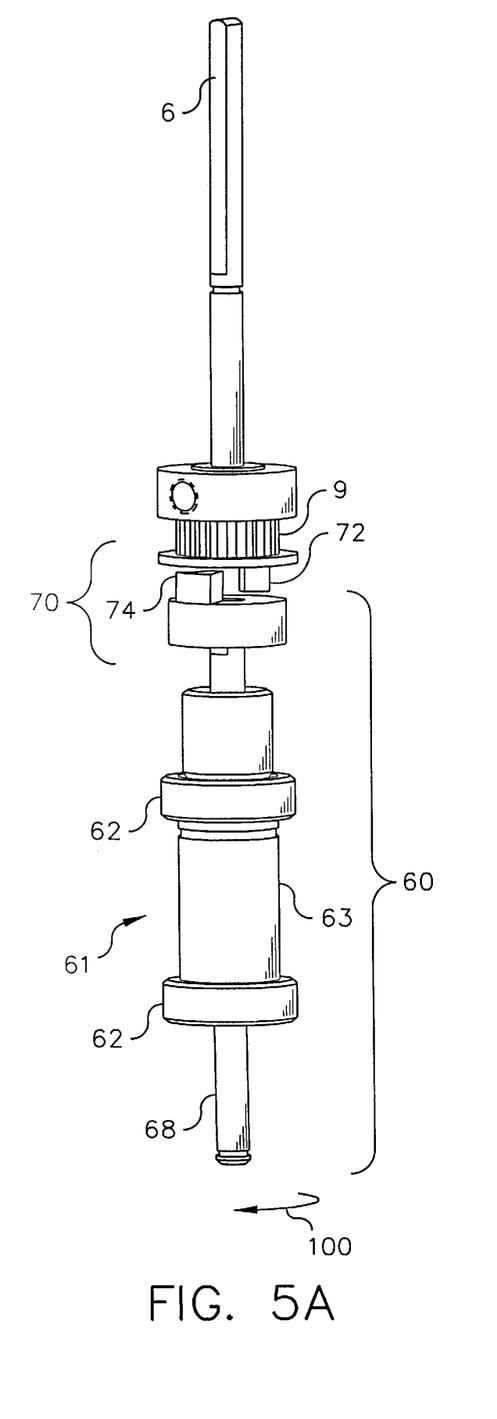
FIG. 5A is an exploded view of a first drive assembly of the apparatus of FIG. 1.
Figure 5B:
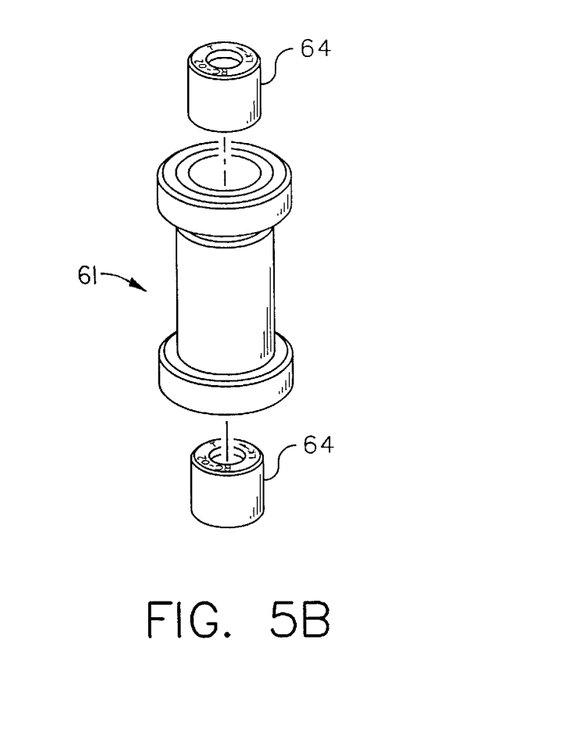

Capstan roller 61 has two directional clutches 64, as best seen in FIGS. 5B and 5C. Clutches 64, engage with capstan shaft 68 only when the capstan shaft 68 is turning in a clockwise direction as viewed from above in the drawings (that is, in the direction of arrow 100). Capstan shaft 68 of the first drive assembly 60 is connected to be driven by main drive shaft 6 through a dwell mechanism 70. Mechanism 70 uses a boss 74 on a hub on an upper end of shaft 68, and a boss 72 on a lower side of belt pulley 9. These are arranged so that when boss 72 is in contact with boss 74 to drive shaft 68, and main drive shaft 6 is then reversed in direction, there is about a 270 degree delay before boss 72 then again contacts boss 74.

A scanner of the present invention using the transport apparatus described, will have a light source positioned to shine through aperture 112. On the opposite side of aperture 112 is positioned a imaging lens and a sensor (such as a CCD line sensor). Light from the source will pass through a film 2 at aperture 112 and then through the lens to the sensor. Additionally, suitable electronics are provided to convert the sensor signal to a digital image signal corresponding to the image scanned from each image frame 2b, which may be stored in a memory of the computer for processing as desired.

Operation of the film transport apparatus of the drawings, will now be described. When an APS film cartridge 1 is inserted into the drive mechanism, a mechanism (not shown) which locks the cartridge in the gate also opens the light lock door. Such mechanisms are well known in any APS cartridge equipment, including APS cameras, processing equipment and the like. When the host computer tells the scanner gate to thrust film out, drive motor 3 begins turning clockwise as viewed from above (that is, in the direction of arrow 104 in FIG. 1), transmitting drive torque to the spool in APS film cartridge 1 through the transmission assembly as described above. This will cause second rocker arm 40 to move second gear 17a into engagement with thrust gear 19, and first rocker arm 50 to move second gear 17b out of engagement with rewind gear 20. Clutch 18 will therefore be engaged and spindle 21 will rotate in the direction of arrow 21b in FIG. 2A to thrust film 2 from cartridge 1.

The Thrust Discs inside cartridge 1 then begin moving film 2 out and into channel 114 in film track 110. Because the thrust motion is created by the friction between the thrust discs and the edges of the film, the film advancement will not be smooth until the film reaches capstan roller 61 and pressure bearing rollers 71. At that point, capstan roller 61 and pressure bearing rollers 71 will begin pulling film 2 from cartridge 1 at a rate faster than the spindle 21 is pushing film 2 from cartridge 1. This causes the drive shaft attached to the thrust gear 19 to disengage from the directional clutch 18 allowing the rewind gear 20 and spindle 21 to spin freely.

Film 2 advances until a first one of the image frames 2b is aligned with aperture 112 where the focus scanning procedure takes place. When the focus scan is complete, the image frame at aperture 112 must be retracted away from aperture 112 before prescan can begin. To do this, drive motor 3 is controlled by the computer to begin driving in a counterclockwise direction (opposite to the direction of arrow 104 in FIG. 1). This causes transfer gear 22 to turn in a counter clockwise direction also (that is, in the direction of arrow 87 in FIG. 4B). As described above, first rocker arm 50 will then swing to the left carrying now clockwise rotating first gear 17b into engagement with rewind gear 20. At the same time second rocker arm 40 will carry second gear 17a out of engagement with thrust gear 19. Thus, drive the film spool in APS Film Cartridge 1 will be driven counterclockwise viewed from above in FIG. 1, resulting in film being rewound back into cartridge 1. The counter clockwise rotation of the capstan shaft 68 causes it to disengage from the directional clutches 64 in the capstan roller 61. This allows film 2 to be rewound into cartridge 1 by being pulled into cartridge 1. The revolutions per minute ("rpm") of capstan roller 61 should not exceed the rpm of capstan shaft 68 to avoid a binding condition of the gear train. Thus, the transmission assembly components will be selected to ensure the foregoing limitation is met. Capstan roller 61 and pressure bearing rollers 71 will add a drag on film 2 during rewinding, which helps keeps film 2 winding tightly on the cartridge spool inside the thrust discs of cartridge 1. A leader 2c on film 2 is still in contact with the capstan roller 61 and pressure rollers 71 at this point.

The direction of motor 3 is then reversed to clockwise again, to pull film 2 out of cartridge 1 by capstan roller 61 and pressure rollers 71, for prescanning. When the scanner prescans film 2, film 2 moves at a constant velocity as all image frames 2b are sampled by the sensor consecutively. Film 2 does not start and stop at each frame. Because the film and gear train are under tension from rewinding the film into the APS film cartridge 1, when motor 3 changes direction to clockwise and the capstan roller 61 begins pulling the film from the APS film cartridge 1, first rocker arm 50 may not have enough time to disengage first gear 17b from the thrust gear 19. This situation is prevented by dwell mechanism 70. As described above, the 270 degree dwell provided by dwell mechanism 70 gives first rocker arm 50 time to disengage first gear 17b and the second rocker arm 40 time to engage second gear 17a with thrust gear 19. When the prescan motion begins the film is therefore under the control of the capstan roller 61.

When the prescan is done, the drive motor 3 reverses direction again to counterclockwise, the first and second rocker arms 50, 40 again move first gear 17b into engagement with rewind gear 20 and second gear 17a out of engagement with thrust gear 19. Film is then pulled back into cartridge 1 one image frame at a time after a high resolution scan is completed on each image frame. Once all of film 2 has been rewound inside APS film cartridge 1, the VEI (Visual Exposure Indicator) must be positioned at the proper orientation for "Processed Film". This positioning is accomplished by using the magnet 36 on the bottom of the rewind gear 20 to actuate a Hall Effect Sensor (not shown) which stops motor 3 at the proper postion corresponding to the correct postioning of the VEI.

The invention has been described with reference to a preferred embodiment. However, it will be appreciated that variations and modifications can be effected by a person of ordinary skill in the art without departing from the scope of the invention.

| PARTS LIST | |
|---|---|
| 1 | Film Cartridge |
| 2 | Film |
| 2a | Edge Margins |
| 2b | Image Frames |
| 2c | Leader |
| 3 | Drive Motor |
| 4 | Pulley |
| 5 | Belt |
| 6 | Drive Shaft |
| 7 | Pulley |
| 8 | Belt |
| 9 | Pulley |
| 14 | Shaft |
| 15 | Main Gear |
| 16 | Idler Gear |
| 17a | Second Moveable Gear |
| 17b | First Moveable Gear |
| 18 | Clutch |
| 18a | Opening |
| 19 | Thrust Gear |
| 20 | Rewind Gear |
| 20a | Direction of Arrow |
| 21 | Spindle |
| 21a | Upper End |
| 21b | Direction of Arrow |
| 22 | Transfer Gear |
| 23 | Belt Tensioner |
| 30 | Busing |
| 32 | Spring |
| 36 | Magnet |
| 38 | Two Fins |
| 40 | Rocker Arm |
| 42 | Remote End |
| 46 | Spring |
| 48a | Remote End |
| 50 | Rocker Arm |
| 52 | Remote End |
| 54 | Two Caps |
| 56 | Spring |
| 58 | Pin |
| 58a | Remote End |
| 58b | End |
| 58c | Shoulder |
| 60 | Drive Assembly |
| 61 | Roller |
| 62 | Wheels |
| 63 | Region |
| 64 | Clutches |
| 68 | Shaft |
| 71 | Rollers |
| 72 | Boss |
| 74 | Boss |
| 86 | Arrow |
| 87 | Direction of Arrow |
| 90 | Direction of Arrow |
| 92 | Direction of Arrow |
| 100 | Direction of Arrow |
| 104 | Direction of Arrow |
| 110 | Fim Track |
| 112 | Aperture |
| 114 | Channel |

It is claimed:

1. A film transport apparatus for selectively advancing a film out of, or rewinding a film onto, a spool shaft of a cartridge, comprising:

a) A rotatable member which engages the spool shaft;

b) a main drive shaft rotatable in either direction;

c) a first drive assembly connected to be driven from the main drive shaft, for pulling on film remote from the cartridge to assist in advancing the film out of the cartridge;

d) a transmission assembly connected to be driven from the main drive shaft, to thrust film from the spool shaft and rewind it onto the spool shaft, comprising:

a rewind gear positioned to rewind the rotatable member, and a thrust gear positioned to advance the rotatable member through a directional clutch such that when film is pulled from the spool shaft by the first drive assembly the thrust gear will disengage from the rotatable member; and a gear train connected to be driven from the main drive shaft which selectively engages the thrust or rewind gear;

wherein the gear train comprises:

a transfer gear driven from the main drive shaft;

first and second independently moveable gears engaged with the transfer gear which selectively engage the rewind or thrust gears, respectively.

2. A film transport apparatus according to claim 1 wherein the first drive assembly comprises a main drive roller which can contact and pull on the film to assist in advancing it out of the cartridge, and a one way clutch between the main drive roller and the main drive shaft such that when film is pulled back onto the spool shaft by the rewind gear the main driver roller is disengaged from the main drive shaft.

3. A film transport apparatus according to claim 1, wherein the first and second moveable gears are mounted so that both cannot simultaneously engage their respective rewind and thrust gears.

4. A film transport apparatus according to claim 3 wherein the first and second gears have respective first and second axially extending members, and are rotatably mounted on respective first and second rocker arms having remote ends, such that when one of the first and second gears is engaged with the rewind or thrust gear, respectively, the remote end of the corresponding rocker arm is in the path of the axially extending member of the other one to prohibit the other one from simultaneously engaging with the rewind or thrust gear.

5. A film scanner comprising the film transport apparatus of claim 4, and additionally comprising:

an elongated film guide positioned to guide film being advanced from or rewound into a cartridge, the guide having an aperture positioned between a cartridge in the apparatus and the first drive assembly; and a light source and a sensor positioned on opposite sides of the aperture such when an image frame of a film to be scanned is positioned in alignment with the aperture, light from the source can pass through the image frame and the aperture and to the sensor.

6. A film transport apparatus according to claim 1 additionally comprising a dwell mechanism between the main drive shaft and the first drive assembly, to allow the first gear to be disengaged from the rewind gear prior to the first drive assembly pulling the film.

7. A film scanner comprising a film transport apparatus for selectively advancing a film out of, or rewinding a film onto, a spool shaft of a cartridge, having:

a) a rotatable member which engages the spool shaft;

b) a main drive shaft rotatable in either direction;

c) a first drive assembly connected to be driven from the main drive shaft, for pulling a film remote from the cartridge to assist in advancing the film out of the cartridge;

d) a transmission assembly connected to be driven from the main drive shaft, to thrust film from the spool shaft and rewind it onto the spool shaft, comprising:

a rewind gear positioned to rewind the rotatable member, and a thrust gear positioned to advance the rotatable member through a directional clutch such that when film is pulled from the spool shaft by the first drive assembly the thrust gear will disengage from the rotatable member; and a gear train connected to be driven from the main drive shaft which selectively engages the thrust or rewind gear;

the scanner additionally comprising:

an elongated film guide positioned to guide film being advance from or rewound into a cartridge, the guide having an aperture positioned between a cartridge in the apparatus and the first drive assembly; and a light source and a sensor positioned on apposite sides of the aperture such when an image frame of a film to be scanned is positioned in alignment with the aperture, light from the source can pass through the image frame and the aperture and to the sensor.

8. A film transport apparatus for selectively advancing a film out of, or rewinding a film onto, a spool shaft of a cartridge, comprising:

a) a rotatable member which engages the spool shaft;

b) a main drive shaft rotatable in either direction;

c) a first drive assembly connected to be driven from the main drive shaft, for pulling on film remote from the cartridge to assist in advancing the film out of the cartridge;

d) a transmission assembly connected to be driven from the main drive shaft, to thrust film from the spool shaft and rewind it onto the spool shaft, comprising;

a rewind gear positioned to rewind the rotatable member, and a thrust gear positioned to advance the rotatable member through a directional clutch such that when film is pulled from the spool shaft by the first drive assembly the thrust gear will disengage from the rotatable member; and a gear train connected to be driven from the main drive shaft which selectively engages the thrust or rewind gear;

the apparatus additionally comprising a dwell mechanism between the main drive shaft and the first drive assembly, to allow the gear train to be disengaged from the rewind gear prior to the first drive assembly pulling the film.

* * * * *